(12) United States Patent
Ono et al.

(10) Patent No.: US 12,509,927 B2
(45) Date of Patent: Dec. 30, 2025

(54) DOOR HANDLE DEVICE FOR VEHICLE

(71) Applicant: ALPHA CORPORATION, Yokohama (JP)

(72) Inventors: Takashi Ono, Yokohama (JP); Noriaki Ito, Yokohama (JP); Kazuhisa Yabumoto, Yokohama (JP); Hideki Sano, Yokohama (JP)

(73) Assignee: Alpha Corporation, Yokohama (JP)

( * ) Notice: Subject to any disclaimer, the term of this patent is extended or adjusted under 35 U.S.C. 154(b) by 68 days.

(21) Appl. No.: 18/253,202

(22) PCT Filed: Oct. 14, 2021

(86) PCT No.: PCT/JP2021/038118
§ 371 (c)(1),
(2) Date: May 16, 2023

(87) PCT Pub. No.: WO2022/130765
PCT Pub. Date: Jun. 23, 2022

(65) Prior Publication Data
US 2024/0011338 A1  Jan. 11, 2024

(30) Foreign Application Priority Data
Dec. 15, 2020 (JP) .................................. 2020-207779

(51) Int. Cl.
*E05B 85/16* (2014.01)
*E05B 81/76* (2014.01)

(52) U.S. Cl.
CPC .............. *E05B 85/16* (2013.01); *E05B 81/77* (2013.01)

(58) Field of Classification Search
CPC .......... E05B 85/10; E05B 85/14; E05B 85/16; E05B 85/18; E05B 81/76; E05B 81/77
See application file for complete search history.

(56) References Cited

U.S. PATENT DOCUMENTS 8,601,903 B1 * 12/2013 Klein ...................... E05B 81/78
                                                  74/543
2006/0232378 A1   10/2006 Ogino et al.
(Continued)

FOREIGN PATENT DOCUMENTS

CN      206495578      9/2017
DE   202015106587     10/2016
(Continued)

OTHER PUBLICATIONS

English translation of description of DE202015106587U1 (Year: 2016).*
(Continued)

*Primary Examiner* — Christine M Mills
*Assistant Examiner* — Christopher F Callahan
(74) *Attorney, Agent, or Firm* — Cook Alex Ltd.

(57) ABSTRACT

A door handle device for a vehicle includes: a handle member attached to a door to be handled by a user, the handle member having a front cover, and a back cover; and a handling detection sensor for detecting the handling of the handle member, wherein the back cover includes: a pair of movement-restricted portions arranged at both ends of the back cover, wherein relative movement of the pair of movement-restricted portions to the front cover is restricted; and a flexible portion arranged between the pair of movement-restricted portions, the flexible portion being bendable according to the handling; and wherein the handling detection sensor detects the bending of the flexible portion.

7 Claims, 21 Drawing Sheets

(56) References Cited

U.S. PATENT DOCUMENTS

| | | | |
|---|---|---|---|
| 2013/0113504 A1* | 5/2013 | Tsurumaki | G01R 1/04 |
| | | | 324/658 |
| 2015/0337571 A1 | 11/2015 | Henderson | |
| 2018/0209182 A1 | 7/2018 | Beck et al. | |
| 2022/0154498 A1 | 5/2022 | Sato et al. | |
| 2023/0212891 A1 | 7/2023 | Ishii et al. | |

FOREIGN PATENT DOCUMENTS

| | | | | |
|---|---|---|---|---|
| DE | 202015106587 U1 * | 11/2016 | | |
| JP | 2003509607 | 3/2003 | | |
| JP | 2005098016 | 4/2005 | | |
| JP | 2006233447 | 9/2006 | | |
| JP | 2007177508 | 7/2007 | | |
| WO | WO-2005031092 A1 * | 4/2005 | ........... | B60R 25/246 |
| WO | WO2021/044649 | 3/2021 | | |
| WO | WO2021/215062 | 10/2021 | | |

OTHER PUBLICATIONS

International Preliminary Report on Patentability (with English-language translation), counterpart International App. No. PCT/JP2021/038118 (Jun. 13, 2023) (12 pages).

International Search Report (with English translation), counterpart International App. No. PCT/JP2021/038118 (Dec. 14, 2021) (5 pages).

Extended European Search Report, counterpart European App. No. 21906129.8 (Nov. 7, 2024) (9 pages).

* cited by examiner

DOOR HANDLE DEVICE FOR VEHICLE

The present application is a U.S. National Stage of PCT International Patent Application No. PCT/JP2021/038118, filed Oct. 14, 2021, which claims priority to JP Application No. 2020-207779, filed Dec. 15, 2020, both of which are hereby incorporated herein by reference in their entirety.

FIELD OF THE INVENTION

This disclosure relates to a door handle device for a vehicle, used for opening and closing a vehicle door.

BACKGROUND OF THE INVENTION

A conventionally used door handle device for a vehicle of this type includes, for example, the configuration disclosed in Patent Literature 1 below. That is, in the conventional door handle device for a vehicle, a grip portion of a handle grip comprises a handled member that moves in parallel to a grip surface due to a gripping force when the grip portion is gripped, wherein the parallel movement of the handled member is detected by a switch. When the switch detects the parallel movement of the handled member, control such as switching of a door lock to an unlocked state is performed.

CITATION LIST

Patent Literature

[Patent Literature 1] Japanese Patent Application Publication No. 2006-233447 A

SUMMARY OF THE INVENTION

The conventional door handle device for the vehicle as described above employs the configuration in which the handled member is moved in parallel. In such a configuration, a stopper is provided that restricts the movement of the handled member by abutting against the handled member in order to define a movement range of the handled member. When the handled member abuts against the stopper upon a user's handling of the handled member, the user feels the abutting, so that the user's handling feeling is deteriorated.

Embodiments according to the present invention have been made to solve the problems as described above. One of objects is to provide a door handle device for a vehicle, which can improve the handling feeling of the user.

The door handle device for the vehicle according to the present embodiment comprises: a handle member attached to a door to be handled by a user during opening and closing of the door, the handle member having a front cover, and a back cover provided integrally with the front cover, the back cover being arranged at a position closer to the door side of the vehicle than the front cover; and a handling detection sensor for detecting the handling of the handle member by the user, wherein the back cover comprises: a pair of movement-restricted portions arranged at both ends of the back cover in a longitudinal direction, wherein relative movement of the pair of movement-restricted portions to the front cover from a front side to a back side and from the back side to the front side in a front-back direction of the handle member is restricted; and a flexible portion arranged between the pair of movement-restricted portions, the flexible portion being bendable according to the handling by the user; and wherein the handling detection sensor detects the bending of the flexible portion.

According to the door handle device for the vehicle of the present embodiment, the back cover has the flexible portion arranged between the pair of movement-restricted portions, and the handling detection sensor detects the bending of the flexible portion, so that a risk that the user will feel the abutting can be reduced, and the handling feeling of the user can be improved.

DETAILED DESCRIPTION OF THE INVENTION

Hereinafter, embodiments for implementing the present invention will be described with reference to the drawings. The present invention is not limited to each embodiment, and components can be modified and embodied without departing from the spirit of the present invention. Further, various inventions can be formed by appropriately combining a plurality of components disclosed in each embodiment. For example, some components may be removed from all of the components shown in the embodiments. Furthermore, the components of different embodiments may be optionally combined.

<Regarding Overall Structure>

Figure 1:
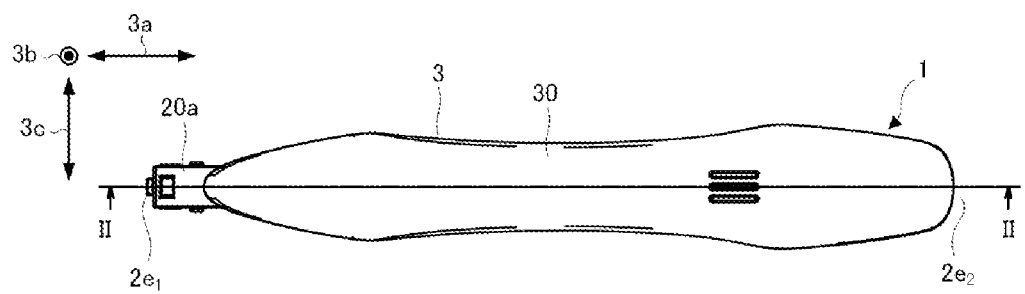
FIG. 1 is a front view showing a door handle device for a vehicle according to an embodiment of the present invention.
Figure 4:
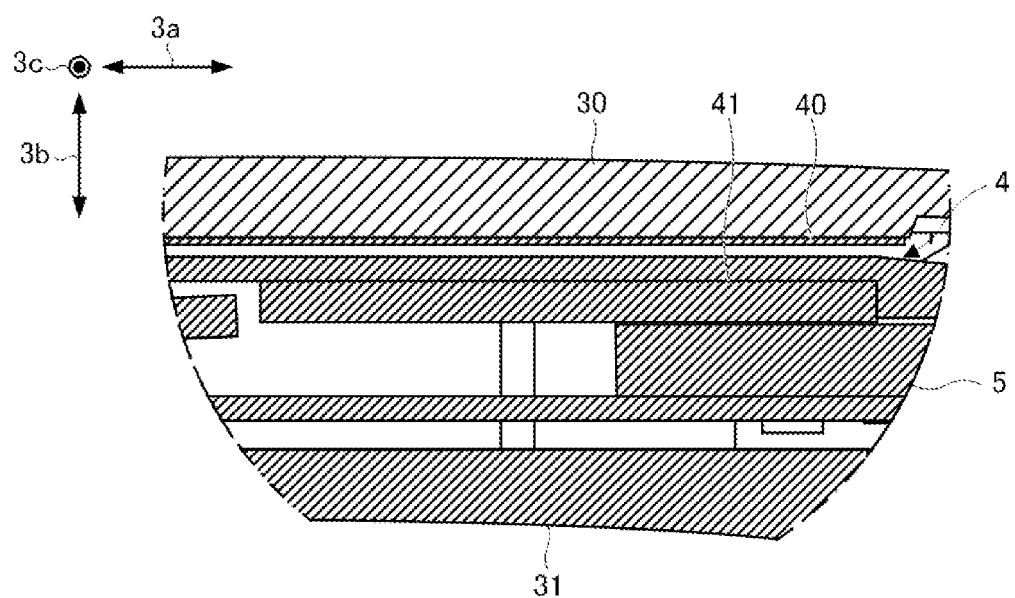
FIG. 4 is an enlarged view showing an enlarged region IV in FIG. 2.
Figure 5:
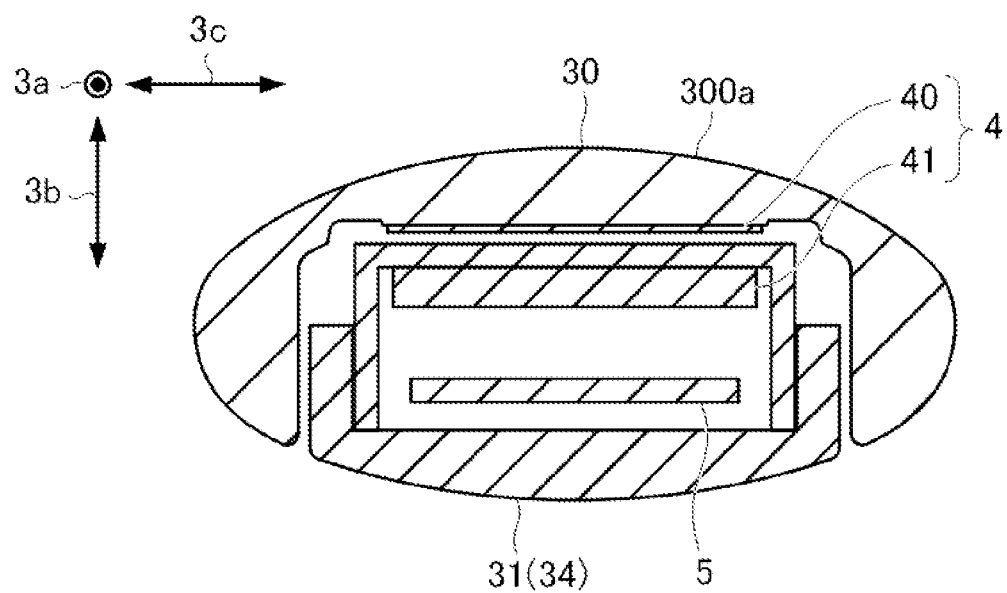
FIG. 5 is a cross-sectional view of the door handle device for the vehicle taken along the line V-V in FIG. 2.

First, the overall structure of a door handle device 1 for a vehicle according to an embodiment of the present invention will be described with reference to FIGS. 1 to 5. FIG. 1 is a front side view showing the door handle device 1 for the vehicle according to an embodiment of the present invention, FIG. 2 is a cross-sectional view of the door handle device 1 for the vehicle taken along the line II-II in FIG. 1, FIG. 3 is a back side view showing the door handle device 1 for the vehicle in FIG. 1, FIG. 4 is an enlarged view showing an enlarged region IV in FIG. 2, and FIG. 5 is a cross-sectional view of the door handle device 1 for the vehicle taken along the line V-V in FIG. 2.

Figure 2:
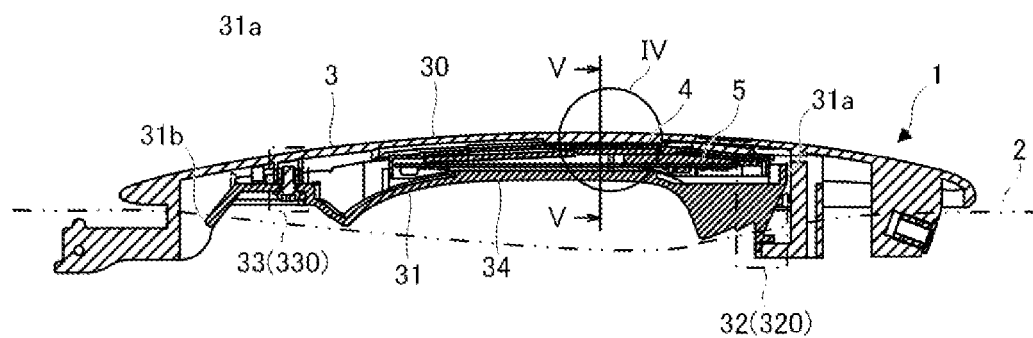
FIG. 2 is a cross-sectional view of the door handle device for the vehicle taken along the line II-II in FIG. 1.
Figure 3:
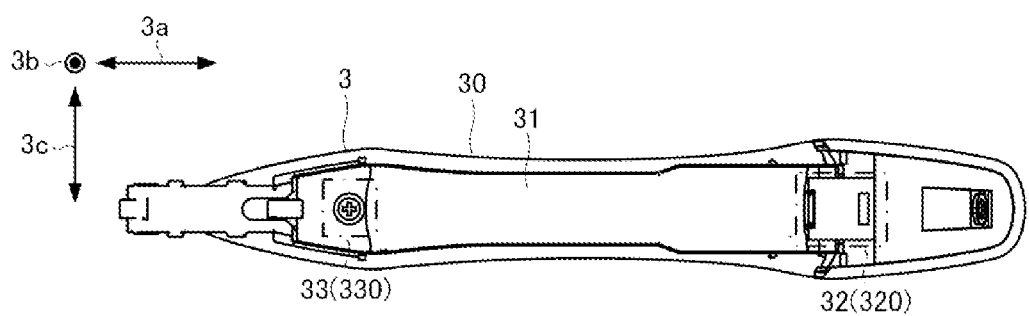
FIG. 3 is a back side view showing the door handle device for the vehicle in FIG. 1.

The door handle device 1 for the vehicle as shown in FIGS. 1 to 3 can be a device attached to a door 2 (see FIG. 2) of a vehicle such as a passenger car. More particularly, the door handle device 1 for the vehicle can be attached to an outer side of the door 2. The door handle device 1 for the vehicle can include: a handle member 3; a handling detection sensor 4; and an entry detection sensor 5.

The handle member 3 can have a longitudinal outer shape as a whole, and it can be a member that is attached to the door 2 of the vehicle and can be handled by a user when opening and closing the door 2. Hereinafter, each portion of the door handle device 1 for the vehicle may be described using terms of a longitudinal direction 3*a*, a front-back direction 3*b*, and a width direction 3*c* of the handle member 3. The longitudinal direction 3*a* can be a long extending direction of the handle member 3. The front-back direction 3*b* may be a direction intersecting with the longitudinal direction 3*a*, and may be a direction in which a front cover 30 and a back cover 31, which will be described later, are stacked on each other. The front side in the front-back direction 3*b* may refer to a side in a direction from the back cover 31 to the front cover 30, and the back side in the front-back direction 3*b* may refer to a side in a direction from the front cover 30 to the back cover 31. The width direction 3*c* may be a direction intersecting with the longitudinal direction 3*a* and the front-back direction 3*b*. The longitudinal direction 3*a*, the front-back direction 3*b*, and the width direction 3*c* may be directions orthogonal to one another. When the handle member 3 is attached to the door 2 of the vehicle, the longitudinal direction 3*a* extends in a front-rear direction of the vehicle, the front-back direction 3*b* extends in the width direction of the vehicle, and the width direction 3*c* extends in the height direction of the vehicle (vertical direction). In respect to the front-back direction 3*b*, the back side may be an inner side in the width direction of the vehicle, and the front side may be an outer side in the width direction of the vehicle.

As shown in FIGS. 1 to 3, the handle member 3 can have the front cover 30 and the back cover 31. Each of the front cover 30 and the back cover 31 may have a longitudinal outer shape as a whole, as with the handle member 3. The longitudinal direction of each of the front cover 30 and the back cover 31 can be synonymous with the longitudinal direction 3*a* of the handle member 3. The front cover 30 and the back cover 31 can be stacked on each other in the front-back direction 3*b* as described above. The back cover 31 can be arranged on the back side of the front cover 30. That is, the back cover 31 can be adapted to be arranged at a position closer to the door side of the vehicle than the front cover 30. The back cover 31 can be provided integrally with the front cover 30 by being assembled to the front cover 30. As will be described below in detail, the back cover 31 can be provided integrally with the front cover 30 while being inserted into an inner space of the front cover 30.

The back cover 31 according to the present embodiment can have first and second movement-restricted portions 32, 33 (a pair of movement-restricted portions) and a flexible portion 34.

The first and second movement-restricted portions 32, 33 can be arranged at both ends of the back cover 31 in the longitudinal direction 3*a*. The first movement-restricted portion 32 can be arranged on one end 31*a* side of the back cover 31 in the longitudinal direction 3*a*. These first and second movement-restricted portions 32, 33 may be portions where relative movement to the front cover 30 in the front-back direction 3*b* from the front side to the back side and from the back side to the front side (that is, in both directions in the front-back direction 3*b*) is restricted. That is, the back cover 31 can be fixed to the front cover 30 at least in the front-back direction 3*b* at the first and second movement-restricted portions 32, 33.

As will be described below in detail, the first and second movement-restricted portions 32, 33 can include: a contact portion 320 (first movement-restricted portion 320) with movement in the front-back direction 3*b* restricted by coming into contact with a structure provided at the front cover 30; and a fastened portion 330 (second movement-restricted portion 33) with movement in the front-back direction 3*b* restricted by fastening it to the front cover 30. However, the mode and/or combination of modes for restricting the movement for the first and second movement-restricted portions 32, 33 in both directions in relation to the front-back direction 3*b* may not be limited to the above embodiment. For example, the movement in the front-back direction 3*b* may be restricted by other modes such as welding, adhesion or claw fitting, and for example, both the first and second movement-restricted portions 32, 33 may be by the same mode. That is, both the first and second movement-restricted portions 32, 33 may be the fastened portions 330.

The flexible portion 34 can be arranged between the first and second movement-restricted portions 32, 33 in the longitudinal direction 3*a*, and it can be a portion that can be deflected according to the user's handling. More particularly, the flexible portion 34 is provided so as to be displaceable relatively to the front side in the front-back direction 3*b* with respect to the front cover 30 due to bending according to the user's handling. More specifically, since the flexible portion 34 elastically deforms (bends) with the first and second movement restricted portions 32 and 33 acting as supporting points when the handle member 3 is subjected to pull handling by the user, it can be arranged to be displaceable toward the front side in the front-back direction 3*b* relatively to the front cover 30. The pull handling is not limited, but it may be a handling by the user who is outside the vehicle for inserting his/her fingers into a space between the door 2 and the handle member 3 and then pulling the handle member 3 forward (toward the outside of the vehicle). As shown in FIG. 5, at least at the position of the flexible portion 34, the back cover 31 can protrude more to the back side in the front-back direction 3*b* than the front cover 30, and can be adapted so that the flexible portion 34 receives the external force due to the pull handing. When the external force due to the pulling handling is no longer applied, the flexible portion 34 can be displaced to the back side relative to the front cover 30 in the front-back direction 3*b* due to the elasticity of the flexible portion 34 itself, and can return back to a predetermined position.

Here, a distance between the first and second movement-restricted portions 32, 33 in the longitudinal direction 3*a* is not limited, but it may preferably be longer than the distance between the one end 31*a* and the first movement-restricted portion 32 in the longitudinal direction 3a, and the distance between the other end 31b and the second movement-restricted portion 33 in the longitudinal direction 3a. That is, it is preferable to ensure the flexible portion 34 in a wider fashion in the longitudinal direction 3a, because the flexible portion 34 can be more reliably bent by the pull handling.

As shown in FIG. 5, the flexible portion 34 can be arranged without contact with a front wall portion 300a of the front cover 30 extending in the longitudinal direction 3a and the width direction 3c when the flexible portion 34 does not receive any external force due to the pull handling. Also, a bent amount (an amount of displacement to the front side) of the flexible portion 34 can be limited by the elasticity of the back cover 31 or the flexible portion 34. Therefore, it is not necessary to restrict the displacement of the flexible portion 34 by bringing another member into contact with the flexible portion 34. In the door handle device 1 for the vehicle according to the present embodiment, the displacement of the flexible portion 34 toward the front side in the front-back direction 3b may not be restricted by contact with another member such as, for example, the front cover 30, when the handle member 3 undergoes the normal manual pull handling. The distance spaced between the flexible portion 34 and the front wall portion 300a of the front cover 30 can be set to be larger than the amount of displacement of the flexible portion 34 toward the front side when the handle member 3 undergoes the normal manual pull handling. The normal manual pull handling can be considered to be a pull handling of, for example, 10 N or less. The flexible portion 34 can be configured to be displaced toward the front side by 0.5 mm or less when subjected to the normal manual pull handling.

The handling detection sensor 4 may be for detecting the handling of the handle member 3 by the user. The handling detection sensor 4 according to this embodiment can be adapted to detect the bending of the flexible portion 34. More particularly, the handling detection sensor 4 according to this embodiment can be adapted to detect the displacement of the flexible portion 34 toward the front side in the front-back direction 3b when the handle member 3 undergoes the pull handling by the user.

The handling detection sensor 4 can be configured by any sensor. The handling detection sensor 4 may be, but not limited to, a contact sensor or a non-contact type sensor. An example of the contact sensor includes a solenoid switch having a plunger that can be displaced together with the flexible portion 34. Examples of the non-contact type sensor include electrostatic capacity type, magnetic type, optical type, and ultrasonic type proximity sensors.

It is preferable to use the non-contact type sensor as the handling detection sensor 4, although not limited thereto. This is because the use of the non-contact type sensor can reduce a risk that the handling detection sensor 4 will hinder the bending of the flexible portion 34. As particularly shown in FIG. 4, the handling detection sensor 4 according to this embodiment can be configured by an inductive sensor having a detected portion 40 attached to the front cover 30 and a detecting portion 41 attached to the back cover 31. The detected portion 40 may include a flat metal plate (conductor). The detecting portion 41 can include a coil and a circuit unit. When the flexible portion 34 is bent, the detecting portion 41 is displaced so as to approach the detected portion 40. The inductive sensor can detect the approaching of the detecting portion 41 to the detected portion 40 in a non-contact manner, and detect the approaching as the bending of the flexible portion 34. The inductive sensor is understandable as a type of magnetic proximity sensor (non-contact type sensor) that utilizes electromagnetic induction between the conductor and the coil. Conversely to the above description, the detected portion 40 may be attached to the back cover 31 and the detecting portion 41 may be attached to the front cover 30. By using an inductive sensor, the bending of the flexible portion 34 can be more reliably and accurately detected even if the bending of the flexible portion 34 is slight.

The entry detection sensor 5 may be a sensor for detecting entry of an object into a space between the door 2 and the handle member 3. The entry detection sensor 5 can detect the entry of the user's hand into the space.

The entry detection sensor 5 can be configured by any sensor. The entry detection sensor 5 may be a non-contact type sensor or a contact sensor. Examples of the non-contact type sensor include electrostatic capacity type, magnetic type, optical type, and ultrasonic type proximity sensors or cameras. For example, when the entry detection sensor 5 is the electrostatic capacity type proximity sensor, the entry of the object can be detected depending on changes in the electrostatic capacity of the space. The camera can image the handle member 3 or the hands of the user. By analyzing the image data captured by the camera, it is possible to detect the entry of the object into the space. Examples of the camera include an in-vehicle camera, a side mirror camera, and a camera for monitoring the surroundings of the vehicle. Examples of the contact sensor include electrostatic capacity type touch sensors or ultrasonic type touch sensors. For example, when the entry detection sensor 5 is the contact type sensor of the electrostatic capacity type, the contact of a foreign object may be detected as the entry of the object into the space when it detects that the foreign object is contacted with the back surface of the handle member 3.

The entry detection sensor 5 can be attached at any position. The entry detection sensor 5 according to this embodiment can be attached to the handle member 3. More particularly, the entry detection sensor 5 can be arranged in an inner space between the front cover 30 and the back cover 31. More specifically, the entry detection sensor 5 can be arranged on the back side of the handling detection sensor 4 in the front-back direction 3b in the inner space between the front cover 30 and the back cover 31. The entry detection sensor 5 may form the back surface of the handle member 3 so as to be adjacent to the space between the door 2 and the handle member 3. For example, the entry detection sensor 5 may be provided at another position such as the door 2. Further, when the camera is used as the entry detection sensor 5 as described above, the entry detection sensor 5 may be provided in the vehicle interior or near the side mirror. The position where the entry detection sensor 5 is provided can be changed depending on the type of the sensor that forms the entry detection sensor 5.

A circuit unit (not shown) may be connected to the handling detection sensor 4 and the entry detection sensor 5. The circuit unit is configured by any device such as a storage unit for storing programs, a computer for performing arithmetic processing based on the programs, or a dedicated circuit, for example, and the circuit unit can perform the opening/closing of the door 2, and/or latch releasing in response to signals from the handling detection sensor 4 and the entry detection sensor 5.

<Regarding Front Cover>

Figure 6:
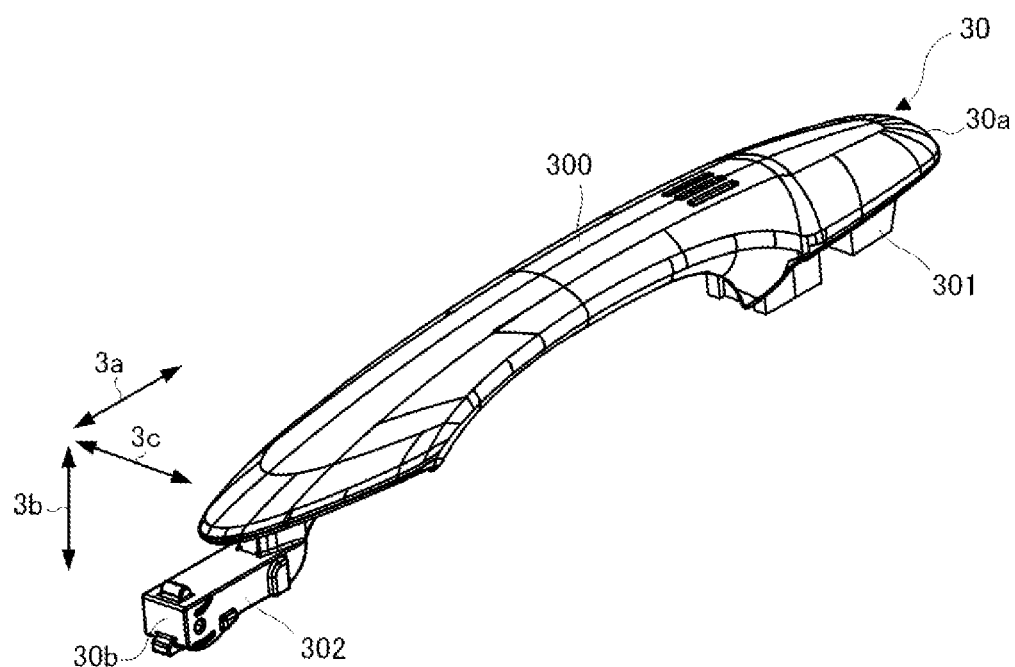
FIG. 6 is a perspective view showing the front cover in FIG. 2.
Figure 7:
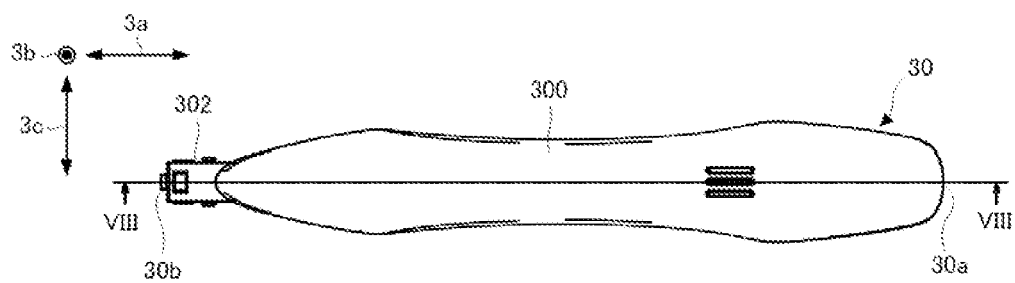
FIG. 7 is a front side view showing the front cover in FIG. 6.
Figure 8:
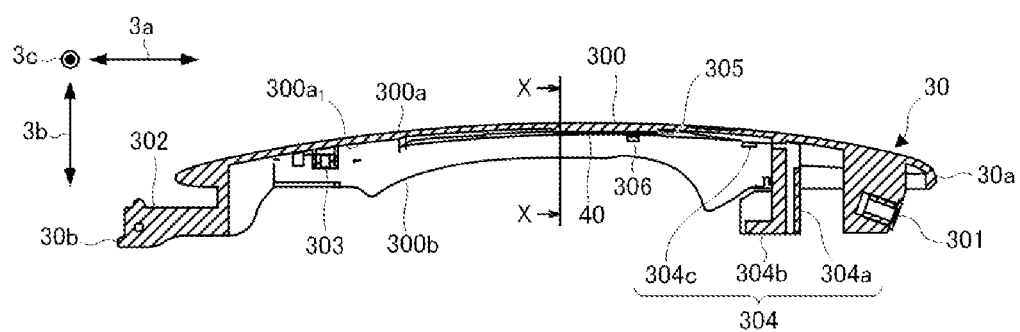
FIG. 8 is a cross-sectional view of the front cover taken along the line VIII-VIII in FIG. 7.
Figure 9:
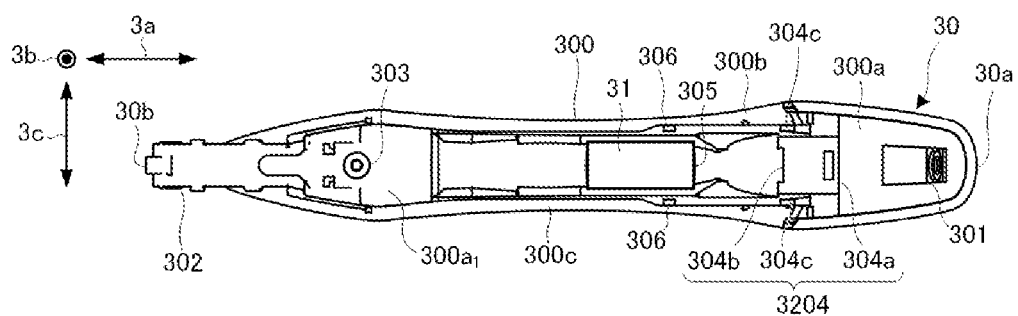
FIG. 9 is a back side view showing the front cover in FIG. 6.
Figure 10:
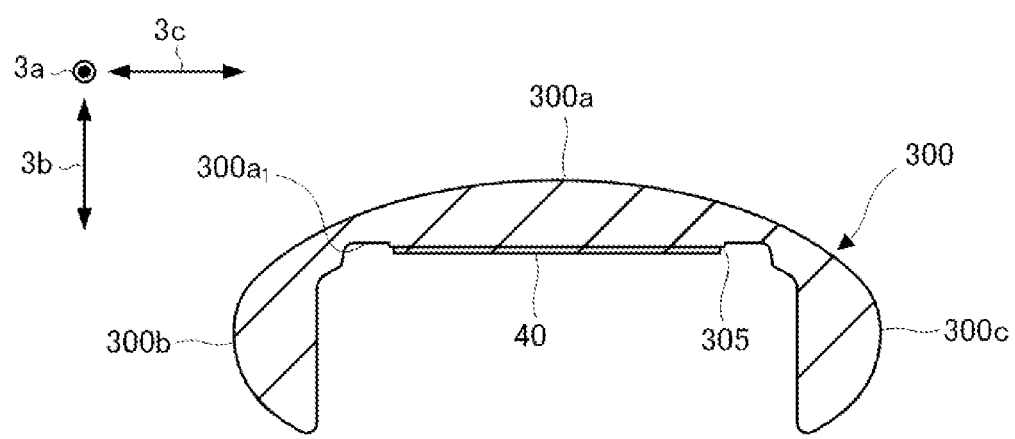
FIG. 10 is a cross-sectional view of the front cover taken along the line X-X in FIG. 8.

Next, one embodiment of the front cover 30 will be described in more detail with reference to FIGS. 6 to 10. FIG. 6 is a perspective view showing the front cover 30 in FIG. 2, FIG. 7 is a front side view showing the front cover 30 in FIG. 6, and FIG. 8 is a cross-sectional view of the front cover 30 taken along the line VIII-VIII in FIG. 7, FIG. 9 is a back side view showing the front cover 30 in FIG. 6, and FIG. 10 is a cross-sectional view of the front cover 30 taken along the line X-X in FIG. 8.

As shown in FIGS. 6 to 9, the front cover 30 may include: a front cover body 300; a first leg portion 301; a second leg portion 302; a fastening base portion 303; a receiving portion 304; a first sensor base portion 305; and a bending-restricting portion 306.

The front cover body 300 can be a longitudinal portion extending in the longitudinal direction 3a. The front cover body 300 may be adapted to appear on the outer side of the door 2 when the handle member 3 is attached to the door 2. As shown in FIG. 10, the front cover body 300 can have a U-shaped cross section that opens on the back side in the front-back direction 3b. More particularly, the front cover body 300 can have a front wall portion 300a, a left wall portion 300b, and a right wall portion 300c, which are arranged in a U shape. As particularly shown in FIG. 8, the front wall portion 300a can have a curved cross-sectional shape in which the central portion protrudes toward the front side as compared to both end portions in the longitudinal direction 3a. As shown in FIGS. 2 and 5, and the like, the back cover 31, the handling detection sensor 4, and the entry detection sensor 5 can be inserted into the inner space of the front cover body 300.

The first and second leg portions 301, 302 may be portions extending backward from both ends of the front cover body 300 in the longitudinal direction 3a. The first leg portion 301 can be arranged on the one end 30a side of the front cover 30 in the longitudinal direction 3a. The second leg portion 302 can be arranged on the other end 30b side of the front cover 30 in the longitudinal direction 3a. The first and second legs 301, 302 may be adapted to be inserted into the door 2 and fixed to the structure within the door 2 when the handle member 3 is attached to the door 2 of the vehicle. When the handle member 3 is attached to the door 2 of the vehicle, the first leg portion 301 (on the side of the one end 30a) can be arranged on the rear side of the vehicle, and the second leg portion 302 (on the side of the other end 30b) can be arranged on the front side of the vehicle.

The fastening base portion 303 can be a portion used when the back cover 31 is fastened to the front cover 30. The fastening base portion 303 according to this embodiment can be provided in the inner space of the front cover body 300. The fastening base portion 303 can be structured by a cylindrical body that protrudes backward from a back surface $300a_1$ of the front wall portion 300a of the front cover body 300 and has a screw groove provided therein. The fastening base portion 303 can be arranged at a position closer to the other end 30b than the central position of the front cover body 300 in the longitudinal direction 3a.

The receiving portion 304 can be a portion that receives the end portion of the back cover 31 in the longitudinal direction 3a. The receiving portion 304 according to this embodiment can be arranged at a position closer to the one end 30a than the central position of the front cover body 300 in the longitudinal direction 3a. As particularly shown in FIG. 8, the receiving portion 304 according to this embodiment may include: a support wall portion 304a; and first and second wall portions 304b, 304c facing each other in the front-back direction 3b.

The support wall portion 304a may be a wall portion protruding toward the back side from the back surface $300a_1$ of the front wall portion 300a. The support wall portion 304a may be arranged at a portion closer to the one end 30a than the first and second wall portions 304b, 304c in the longitudinal direction 3a. As shown in FIG. 9, the width of the support wall portion 304a in the width direction 3c can be narrower than that of the front cover body 300 at the position where the support wall portion 304a is provided. The central positions of the support wall portion 304a and the front cover body 300 in the width direction 3c may be matched to each other.

The first and second walls 304b, 304c may be walls facing each other in the front-back direction 3b. The first wall portion 304b can be arranged on the back side in the front-back direction 3b relative to the second wall portion 304c. The first wall portion 304b according to this embodiment can protrude in the longitudinal direction 3a from a tip portion of the support wall portion 304a to the other end 30b side. The second wall portion 304c according to this embodiment may be structured by a pair of walls each protruding from sides of inner surfaces of the left wall portion 300b and the right wall portion 300c of the front cover body 300 to the width direction 3c, at the position spaced apart from the back surface $300a_1$ of the front wall portion 300a of the front cover body 300 in the front-back direction 3b. However, the structures of the first and second wall portions 304b, 304c are not limited to these embodiments, and they may employ other structures such as the second wall portion 304c being structured by the back surface $300a_1$ of the front wall portion 300a of the front cover body 300, for example.

The first sensor base portion 305 may be a portion to which the detected portion 40 (or the detecting portion 41) of the handling detection sensor 4 is attached. The detected portion 40 made of a flat metal plate can be attached to the first sensor base portion 305 according to this embodiment. The first sensor base portion 305 according to this embodiment can be structured by an island-shaped protruded portion slightly protruding toward the back side from the back surface $300a_1$ of the front wall portion 300a, and can be arranged at a position spaced apart from the one end 30a relative to the receiving portion 304 in the longitudinal direction 3a. By configuring the first sensor base portion 305 as a protruded portion, it becomes easy to identify the position where the detected portion 40 is mounted on or attached to the front cover body 300.

The bending-restriction portion 306 may be configured to restrict excessive bending of the flexible portion 34 when an excessive pull handling such as 50 N is performed. At least when the excessive pull handling is performed, a top of a third protruded portion 316 of the back cover 31 (which will be described below) can abut against the bending-restricting portion 306, thereby restricting the excessive bending of the flexible portion 34. In other words, the third protruded portion 316 may be separated from the bending-restricting portion 306 in the front-back direction 3b when the pull handling is not performed and when the normal manual pull handling is performed. The restricting of the excessive bending of the flexible portion 34 can avoid contact of the detected portion 40 with the detecting portion 41 (or a housing 600, which will be described below) and breakage of the detected portion 40 or the detecting portion 41. The bending-restricting portion 306 according to this embodiment can be structured by a pair of walls protruding from the left side wall portion 300b and the right side wall portion 300c of the front cover body 300 to the width direction 3c at a position spaced toward the back side from the first sensor base portion 305 in the front-back direction 3b. The bending-restricting portion 306 can function as an elastic body having a predetermined elasticity when the third protruded portion 316 abuts against. The bending-restricting portion 306 can be arranged within the extension width of the first sensor base portion 305 in the longitudinal direction 3a.

<Regarding Back Cover>

Figure 11:
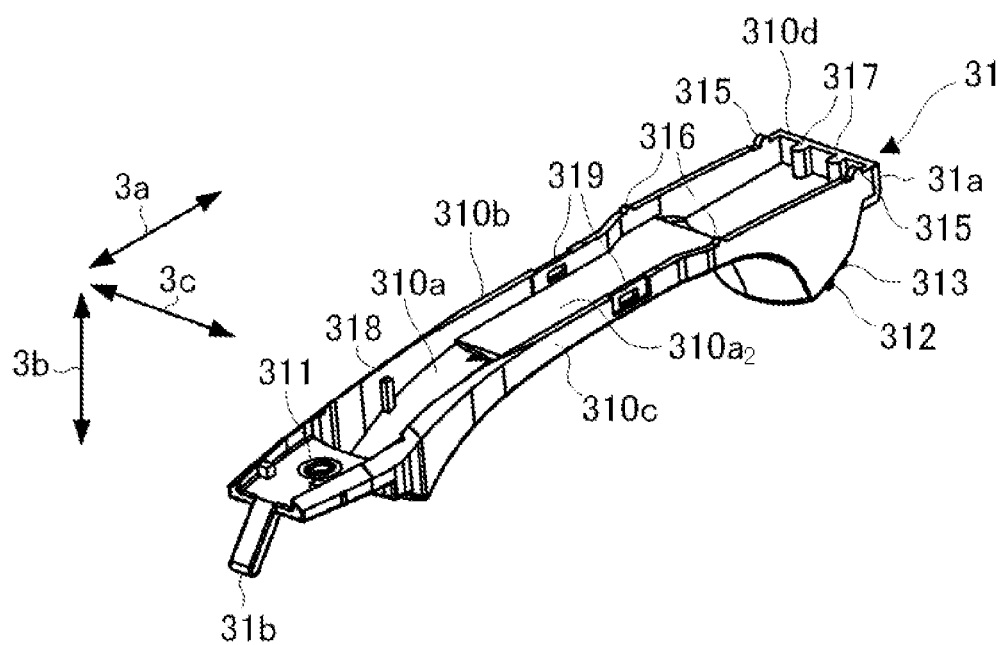
FIG. 11 is a perspective view showing the back cover in FIG. 2.
Figure 13:
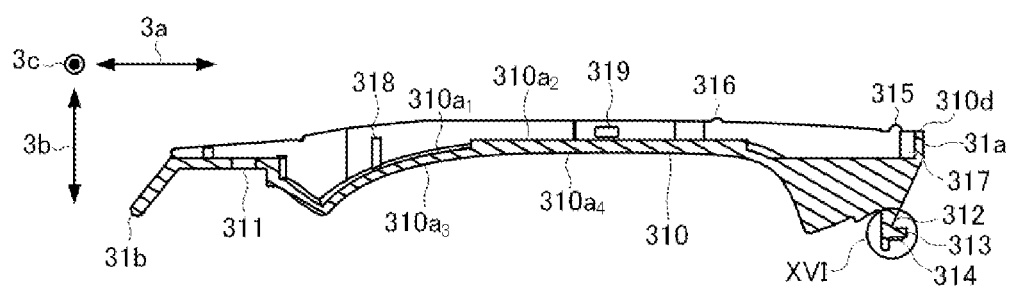
FIG. 13 is a cross-sectional view of the back cover taken along the line XIII-XIII in FIG. 12.
Figure 14:
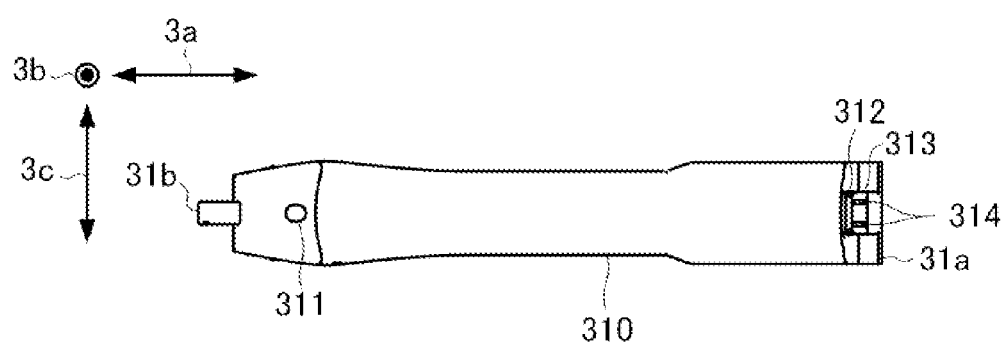
FIG. 14 is a back side view of the back cover in FIG. 11.
Figure 15:
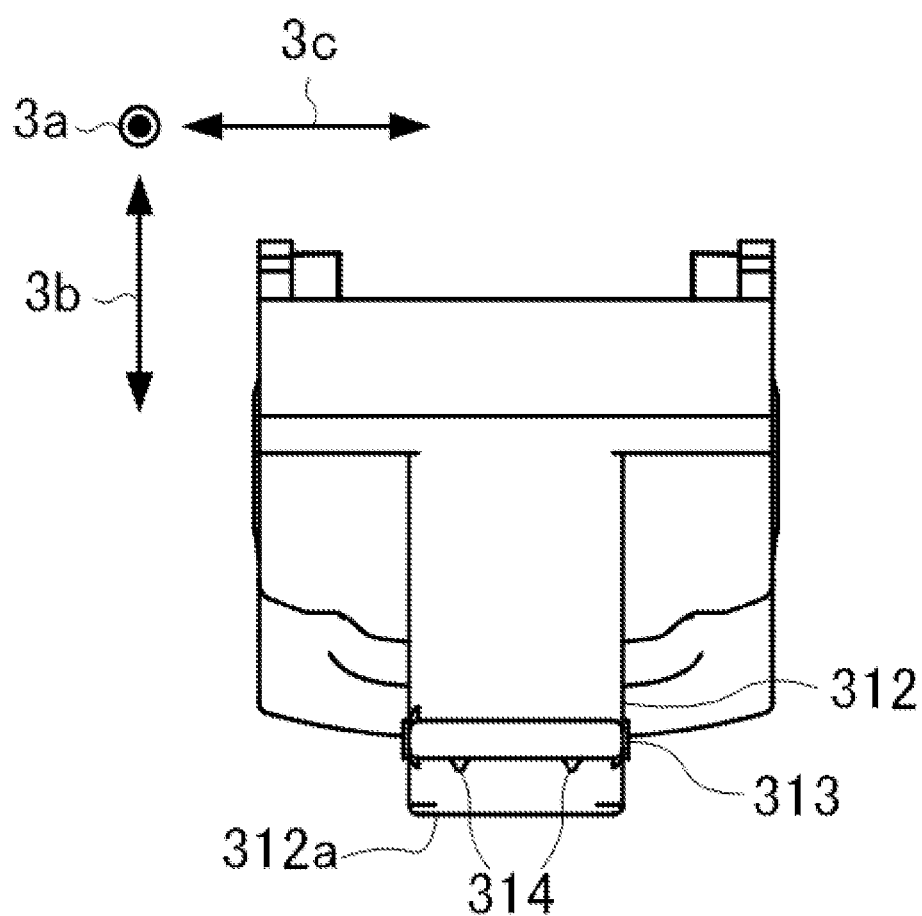
FIG. 15 is a rear end view showing the back cover in FIG. 11.
Figure 16:
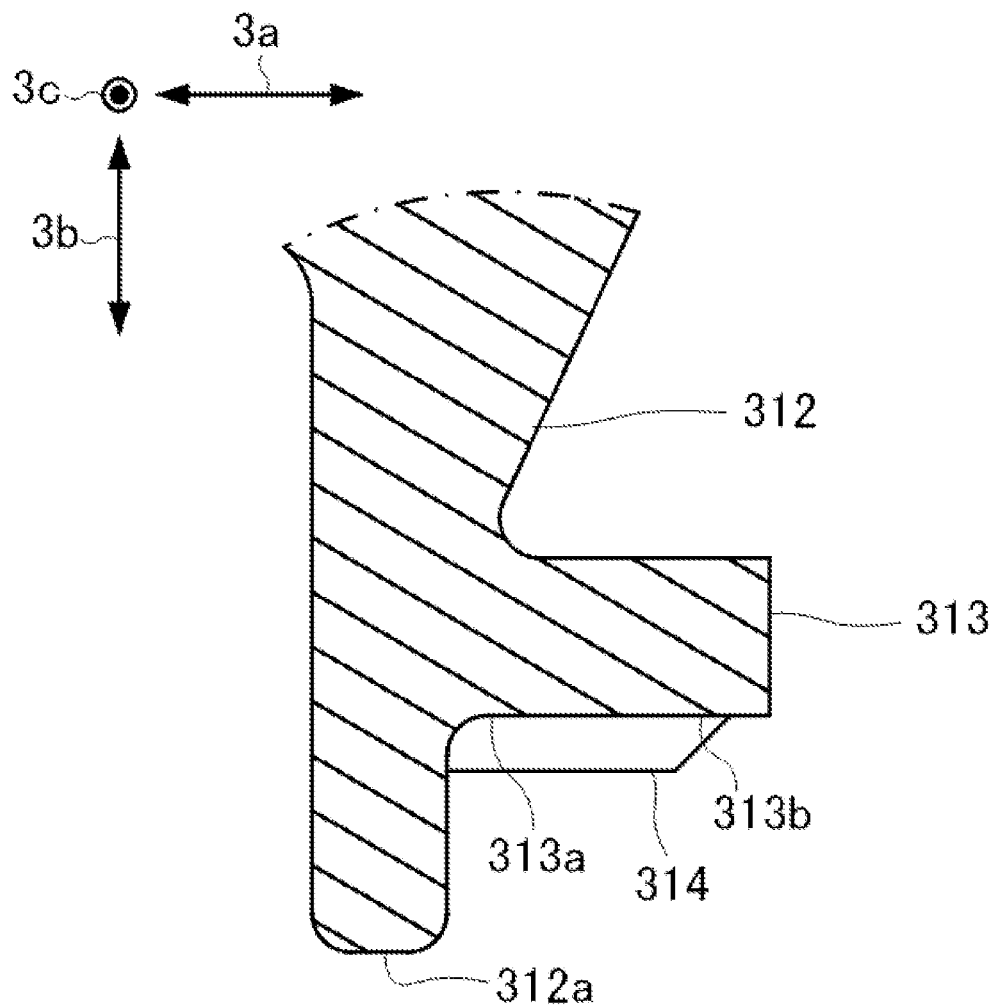
FIG. 16 is an enlarged view of the area XVI in FIG. 13.

Next, one embodiment of the back cover 31 will be described in more detail with reference to FIGS. 11 to 16. FIG. 11 is a perspective view showing the back cover 31 in FIG. 2, FIG. 12 is a front side view showing the back cover 31 in FIG. 11, FIG. 13 is a cross-sectional view of the back cover 31 taken along the line XIII-XIII in FIG. 12, FIG. 14 is a back side view of the back cover 31 in FIG. 11, FIG. 15 is a rear end view showing the back cover 31 in FIG. 11, and FIG. 16 is an enlarged view of the region XVI in FIG. 13.

As shown in FIGS. 11 to 14, the back cover 31 may include: a back cover body 310: a fastening opening 311; a first piece portion 312: a second piece portion 313; a first protruded portion 314; second protruded portions 315; third protruded portions 316; a fourth protruded portion 317; fifth protruded portions 318; and engaging openings 319.

The back cover body 310 can be a longitudinal portion extending in the longitudinal direction 3a. The back cover body 310 can have: a back wall portion 310a; a left side wall portion 310b; a right side wall portion 310c; and a rear end wall portion 310d. The left side wall portion 310b, the right side wall portion 310c, and the rear end wall portion 310d may protrude from a left side portion, a right side portion, and the rear end portion (one end 31a side of the back cover 31) of the back wall portion 310a to the front side in the front-back direction 3b. The back wall portion 310a, the left side wall portion 310b, the right side wall portion 310c, and the rear end wall portion 310d can define the inner space of the back cover body 310 into which the handling detection sensor 4 can be inserted.

Figure 12:
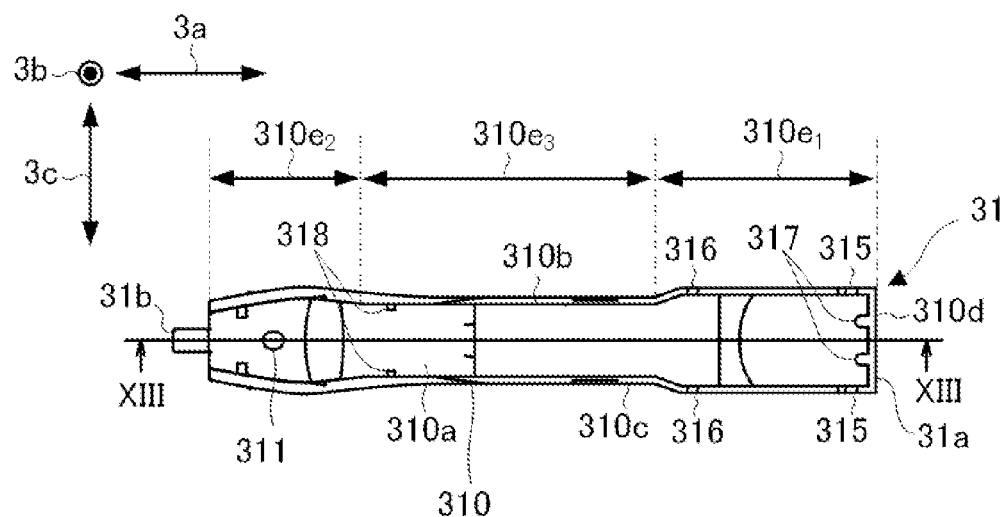
FIG. 12 is a front side view showing the back cover in FIG. 11.

As particularly seen in FIG. 12, the left side wall portion 310b and the right side wall portion 310c may be provided with first and second wide portions $310e_1$, $310e_2$ and a narrow portion $310e_3$. The narrow portion $310e_3$ can be a portion in which a distance between inner surfaces of the left side wall portion 310b and the right side wall portion 310c in the width direction 3c is narrower than the first and second wide portions $310e_1$, $310e_2$, and can be arranged at the central portion of the back cover 31. The first wide portion $310e_1$ can be arranged at a position closer to the one end 31a of the back cover 31 than the narrow portion $310e_3$ in the longitudinal direction 3a. The second wide portion $310e_2$ can be arranged at a position closer to the other end 31b of the back cover 31 than the narrow portion $310e_3$ in the longitudinal direction 3a.

As particularly seen in FIGS. 12 and 13, a front surface $310a_1$ of the back wall 310a may be provided with a second sensor base portion $310a_2$. The second sensor base portion $310a_2$ can be a portion to which the detecting portion 41 (or the detected portion 40) of the handling detection sensor 4 is attached. The detecting portion 41 of the handling detection sensor 4 can be attached to the second sensor base portion $310a_2$ according to this embodiment via a housing 600 of an assembly 6, which will be described below. As particularly shown in FIG. 13, the second sensor base portion $310a_2$ according to this embodiment may include: a protruded portion protruding toward the front surface side from the front surface $310a_1$ of the back wall portion 310a; and arc surfaces arranged on both sides of the protruded portion in the longitudinal direction 3a. The top surface of the protruded portion may be flat, and corners may be formed around the top surface. As shown in FIG. 12, the range in which the second sensor base portion $310a_2$ is provided can overlap with the range in which the narrow portion $310e_3$ is provided, in the longitudinal direction 3a.

The back surface $310a_3$ of the back wall portion 310a may be provided with a recessed portion $310a_4$ recessed toward the front side. Because of the recessed portion $310a_4$, a space into which the hand of the user can be inserted can be formed between the handle member 3 and the door 2 when the handle member 3 is attached to the door 2 of the vehicle. The above second sensor base portion $310a_2$ can be provided on the front side of the recessed portion $310a_4$.

The fastening opening 311 can be a portion that is used when the back cover 31 is fastened to the front cover 30, as with the fastening base portion 303 of the front cover 30 as described above. The fastening opening 311 according to this embodiment can be an opening formed in the back wall portion 310a of the back cover body 310, and can be arranged so as to be stacked on the fastening base portion 303 of the front cover 30 when the back cover 31 is fastened to the front cover 30. By fastening a fastening member 7 described later to the fastening base portion 303 while the fastening opening 311 is stacked on the fastening base portion 303, the fastening portion 330 (the second movement-restricted portion 33) as described above can be formed.

The first piece portion 312 may be a portion protruding toward the back side in the front-back direction 3b from the end of the back cover body 310 in the longitudinal direction 3a. More particularly, the first piece portion 312 can protrude toward the back side from the back surface of the end portion of the front cover body 310 on the one end 31a side (vehicle rear side) of the back cover 31 in the longitudinal direction 3a. As particularly seen from FIGS. 14 and 15, the width of the first piece portion 312 in the width direction 3c can be narrower than that of the back cover body 310 in the same direction. The central positions of the first piece portion 312 and the back cover body 310 in the width direction 3c may be matched to each other. The thickness of the first piece portion 312 in the longitudinal direction 3a can be thinner than that of the back cover body 310 in the longitudinal direction 3a at the base of the first piece portion 312.

The second piece portion 313 may be a portion extending from the first piece portion 312 in the longitudinal direction 3a. More particularly, the second piece portion 313 can extend from the inner end surface of the first piece portion 312 to the one end 31a side (vehicle rear side) of the back cover 31 in the longitudinal direction 3a. As particularly shown in FIGS. 14 and 15, the width of the second piece portion 313 in the width direction 3c can be equal to that of the first piece portion 312 in the same direction. As particularly shown in FIG. 16, the second piece portion 313 can extend from the first piece portion 312 on the front side in the front-back direction 3b relative to the tip 312a of the first piece portion 312 so as to form an L-shaped cross-sectional portion together with the tip portion of the first piece portion 312. The second piece portion 313 is configured such that the second piece portion 313 can be elastically deformed around the base portion 313a of the second piece portion 313 as a center in the front-back direction 3b when the back cover 31 is assembled to the front cover 30, which will be described below. The elasticity of the second piece portion 313 is adjusted by changing various conditions such as the material of the back cover 31 (second piece portion 313) and/or the thickness of the second piece portion 313 in the front-back direction 3b.

The first protruded portion 314 may be a protrusion that protrudes from the back surface of the second piece portion 313 in the front-back direction 3b. The first protruded portion 314 according to this embodiment can include a plurality of protruded portions (more specifically, a pair of protruded portions) spaced apart from each other in the width direction 3c. The first protruded portion 314 may extend in the longitudinal direction 3a. The first protruded portion 314 according to this embodiment can extend in the longitudinal direction 3a from a base portion 313a to a tip portion 313b of the second piece portion 313.

The second protruded portions 315 are protrusions protruded from the tip surfaces (the surfaces on the front side in the front-back direction 3b) of the left side wall portion 310b and the right side wall portion 310c on the one end 31a side of the back cover 31 in the longitudinal direction 3a. As particularly shown in FIG. 13, the second protruded portion 315 can be arranged at the same position as the first protruded portion 314 in the longitudinal direction 3a. Although not limited, the top of the second protruded portion 315 preferably has an arc outer surface as viewed in the cross section of the back cover 31 along the longitudinal direction 3a.

The third protruded portions 316 are protrusions that protrude from the tip surfaces of the left side wall 310b and the right side wall 310c at a position spaced apart from the one end 31a of the back cover 31 relative to the second protruded portions 315 in the longitudinal direction 3a. Although not limited, as particularly shown in FIG. 13, in the longitudinal direction 3a, each of the third protruded portions 316 extends in the range where the second sensor base portion $310a_2$ extends, in other words, in the range where the detecting portion 41 of the handling detection sensor 4 (or the detected portion 40) extends. Each of the third protruded portions 316 according to this embodiment can be arranged at the position closer to the one end 31a side than the central position of the second sensor base portion $310a_2$ in the longitudinal direction 3a. Each of the third protruded portions 316 can be arranged to be positioned on the back side of the bending-restricting portion 306 in the front-back direction 3b when the back cover 31 is assembled to the front cover 30, and can be adapted to abut against the bending-restricting portion 306 and to prevent contact of the detected portion 40 and the detecting portion 41 (or a housing 600 which will described below) when at least excessive pull handling is performed.

The fourth protruded portion 317 may be a protrusion that protrudes toward the inner space of the back cover body 310 from an inner end surface of the rear end wall portion 310d. The fourth protruded portion 317 according to this embodiment can include a plurality of protruded portions (more specifically, a pair of protruded portions) spaced apart from each other in the width direction 3c.

The fifth protruded portions 318 protrude toward the inner space of the back cover body 310 from the inner surfaces of the left side wall portion 310b and the right side wall portion 310c on the other end 31b side of the back cover 31 in the longitudinal direction 3a. Each of the fifth protruded portions 318 according to this embodiment can be arranged at a position closer to the other end 31b than the second sensor base portion $310a_2$ in the longitudinal direction 3a. As particularly shown in FIG. 12, in to the longitudinal direction 3a, each of the fifth protruded portion 318 can be arranged in the range where the narrow portion $310e_3$ extends.

The engaging openings 319 may be openings provided in the left side wall portion 310b and the right side wall portion 310c. As particularly seen in FIG. 13, in the longitudinal direction 3a, the engaging openings 319 can be arranged in the range where the second sensor base portion $310a_2$ and the narrow portion $310e_3$ extend. Each of the engaging openings 319 according to this embodiment can be arranged at a position closer to the other end 31b side than the third protruded portion 316 in the longitudinal direction 3a.

<Regarding Handling Detection Sensor and Entry Detection Sensor>

Figure 17:
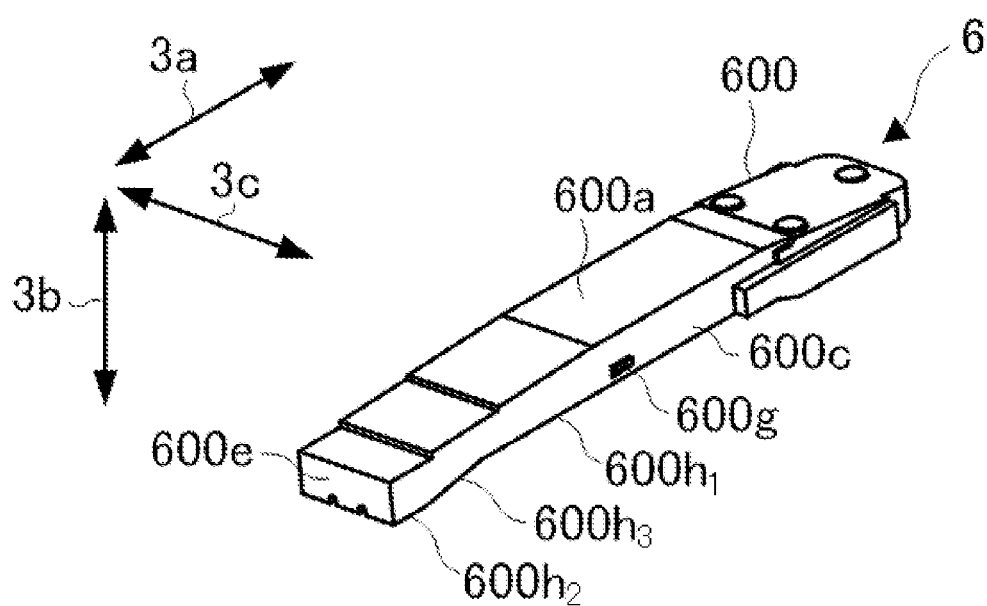
FIG. 17 is a perspective view showing an assembly including a handling detection sensor and an entry detection sensor in FIG. 2.

Next, one embodiment of the handling detection sensor 4 and the entry detection sensor 5 will be described in more detail with reference to FIGS. 17 to 20. FIG. 17 is a perspective view showing an assembly 6 including the handling detection sensor 4 and the entry detection sensor 5 in FIG. 2, FIG. 18 is a front side view showing the assembly 6 in FIG. 17, FIG. 19 is a cross-sectional view of the assembly 6 taken along the line XIX-XIX, and FIG. 20 is a perspective view showing the assembly 6 in FIG. 17 attached to the back cover 31.

The handling detection sensor 4 may be a separate member, but at least a part of the handling detection sensor 4 may be arranged in the inner space between the front cover 30 and the back cover 31 in a state of an assembly 6 integrated with other electronic components. In the door handle device 1 for the vehicle according to this embodiment, the detecting portion 41 of the handling detection sensor 4 and the entry detection sensor 5 as an electronic component can be integrated with each other as the assembly 6. The electronic component integrated with at least a part of the handling detection sensor 4 is not limited to the entry detection sensor 5, and it may be other components such as an antenna for transmitting and receiving radio waves, or a circuit for locking/unlocking and/or releasing a latch of the door 2.

Figure 18:
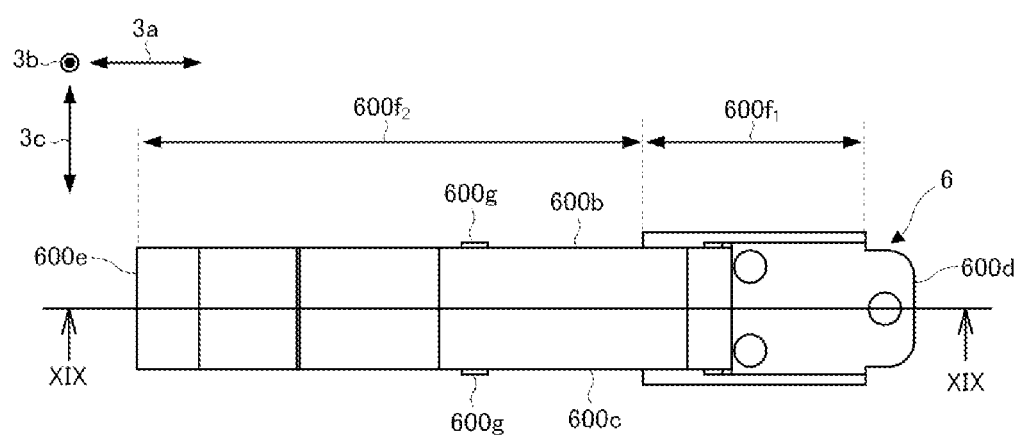
FIG. 18 is a front view of the assembly in FIG. 17.
Figure 19:
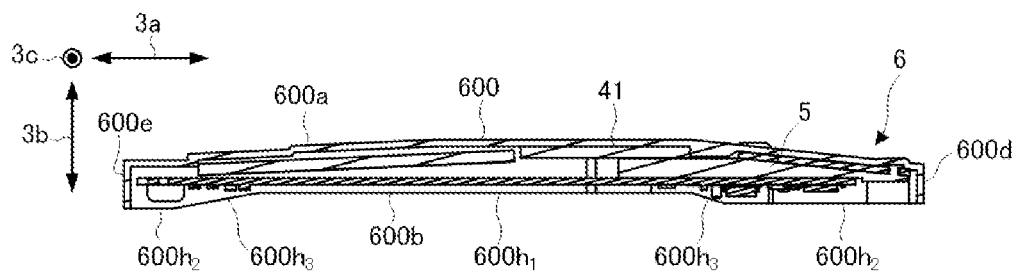
FIG. 19 is a cross-sectional view of the assembly taken along the line XIX-XIX in FIG. 18.
Figure 20:
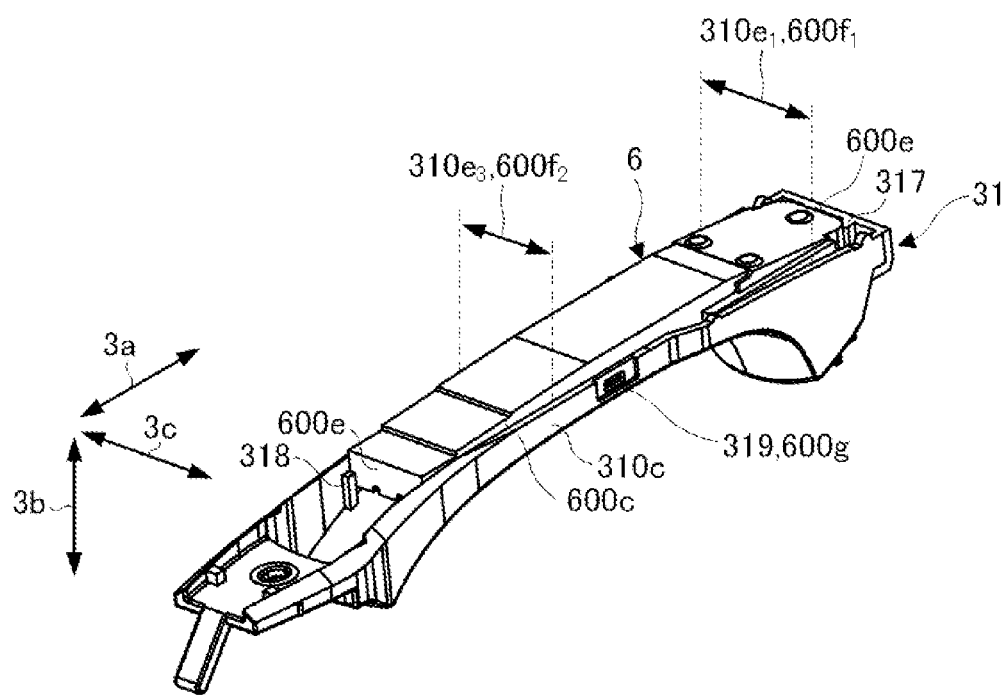
FIG. 20 is a perspective view showing the assembly in FIG. 17 assembled to the back cover.

As shown in FIGS. 17 to 19, the assembly 6 according to this embodiment can include: a housing 600; the detecting portion 41 of the handling detection sensor 4; and the entry detection sensor 5.

The housing 600 can be a member surrounding internal components of the assembly 6. The housing 600 according to this embodiment can be a longitudinal member extending in the longitudinal direction 3a. More specifically, the housing 600 according to this embodiment can have: a front wall portion 600a; a left wall portion 600b; a right wall portion 600c; a rear end wall portion 600d; and a front end wall portion 600e. The left side wall portion 600b, the right side wall portion 600c, the rear end wall portion 600d, and the front end wall portion 600e can protrude from the left side portion, the right side portion, the rear end portion, and the front end portion of the front wall portion 600a to the back side in the front-back direction 3b. The housing 600 according to this embodiment can be opened on the back side in the front-back direction 3b.

The left side wall portion 600b and the right side wall portion 600c may be provided with a wide portion $600f_1$ and a narrow portion $600f_2$. The wide portion $600f_1$ can be a portion where a distance between outer surfaces of the left side wall portion 600b and the right side wall portion 600c in the width direction 3c is wider than that of the narrow portion $600f_2$, and can be arranged on the rear end wall portion 600d side in the longitudinal direction 3a. The narrow portion $600f_2$ can be arranged between the front end wall portion 600e and the wide portion $600f_1$ of the housing 600 in the longitudinal direction 3a.

The outer surfaces of the left side wall portion 600b and the right side wall portion 600c may be provided with engaging protrusions 600g. The engaging protrusions 600g may protrude outward from the outer surfaces of the left side wall portion 600b and the right side wall portion 600c, respectively. Each of the engaging protrusions 600g can be arranged at the central portion of the housing 600 in the longitudinal direction 3a.

A lower portion 600$h_1$, higher portions 600$h_2$, and connecting portions 600$h_3$ can be provided in the front-back direction 3b of the left side wall portion 600b and the right side wall portion 600c. The lower portion 600$h_1$ may be a portion where the heights of the left side wall portion 600b and the right side wall portion 600c in the front-back direction 3b are lower than the higher portion 600$h_2$. When the end face on the back side of each higher portion 600$h_2$ is placed on a flat placing surface, the end face on the back side of the low portion 600$h_1$ can be positioned away from that flat placing surface. The lower portion 600$h_1$ may be understood as a recessed portion. The lower portion 600$h_1$ can be arranged at the central portion of the housing 600 in the longitudinal direction 3a. The higher portions 600$h_2$ can be arranged on both sides of the lower portion 600$h_1$ in the longitudinal direction 3a. Each of the connecting portions 600$h_3$ may be a portion that connects between the lower portion 600$h_1$ and the higher portion 600$h_2$. The end faces on the back side of the connecting portions 600$h_3$ can be inclined surfaces such that the heights of the left side wall portion 600b and the right side wall portion 600c in the front-back direction 3b gradually decrease from the higher portions 600$h_2$ to the lower portion 600$h_1$.

The detecting portion 41 of the handling detection sensor 4 and the entry detection sensor 5 are arranged in the inner space of the housing 600 and can be fixed to the housing 600. As shown in FIG. 19, in the housing 600, the detecting portion 41 can be arranged at a position closer to the front side in the front-back direction 3b than the entry detection sensor 5.

Here, as shown in FIG. 20, the assembly 6 can be inserted into the inner space of the back cover body 310. The distance between the outer surfaces of the rear end wall portion 600d and the front end wall portion 600e of the housing 600 in the longitudinal direction 3a may be matched to the distance between the fourth protruded portion 317 and the fifth protruded portion 318 of the back cover 31 in the longitudinal direction 3a. Therefore, the outer surfaces of the rear end wall portion 600d and the front end wall portion 600e of the housing 600 are in contact with the fourth protruded portion 317 and the fifth protruded portion 318 of the back cover 31, so that the position of the assembly 6 in the longitudinal direction 3a can be determined. It should be noted that the phrase "two distances are matched" may include not only exactly matching of the two distances, but also a slight difference in the two distances (that is, they are substantially matched).

Also, the widths of the wide portion 600$f_1$ and the narrow portion 600$f_2$ of the housing 600 in the width direction 3c can be matched to those of the first wide portion 310$e_1$ and the narrow portion 310$e_3$ of the back cover 31 in the width direction 3c. Therefore, the outer surfaces of the left side wall portion 600b and the right side wall portion 600c of the housing 600 are in contact with the inner surfaces of the left side wall portion 310b and the right side wall portion 310c of the back cover body 310, so that the position of the assembly 6 in the width direction 3c can be determined.

Also, as shown in FIG. 2, the end face on the back side of the lower portion 600$h_1$ of the housing 600 can rest on the top surface of the second sensor base portion 310$a_2$ of the back cover 31. The end face on the back side and top surface may extend such that they are in surface contact with each other. Therefore, the end face on the back side of the lower portion 600$h_1$ of the housing 600 is placed on the top surface of the second sensor base portion 310$a_2$ of the back cover 31, so that the position of the assembly 6 in the front-back direction 3b can be determined.

Also, the engaging protrusions 600g of the assembly 6 can be engaged with the engaging openings 319 of the back cover 31. The position of the assembly 6 can be fixed by the engagement of these engaging protrusions 600g and the engaging openings 319. The engagement can also contribute to the positioning of the assembly 6 in the longitudinal direction 3a, in the front-back direction 3b and in the width direction 3c.

<Method for Assembling Back Cover to Front Cover>

Figure 21:
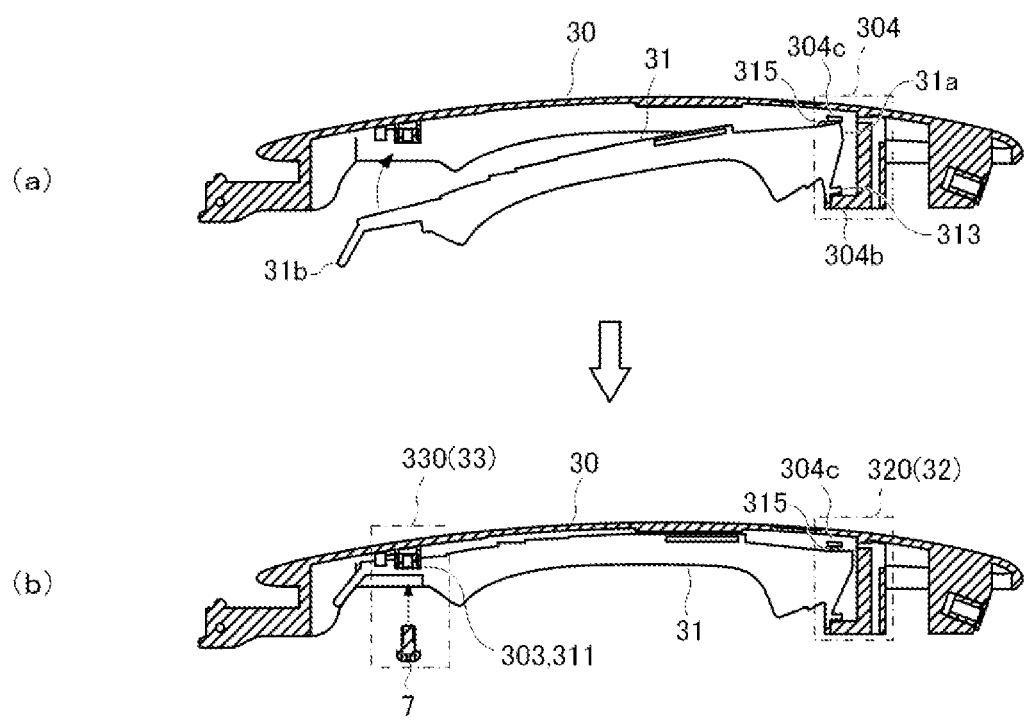
FIG. 21 is an explanatory view showing a method for assembling the back cover to the front cover in FIG. 2.

Next, FIG. 21 is an explanatory view showing one embodiment of a method for assembling the back cover 31 to the front cover 30 in FIG. 2. The assembling of the back cover 31 to the front cover 30 can be performed after the assembly 6 is assembled to the back cover 31. As shown in (a) of FIG. 21, the end portion of the back cover 31 on the one end 31a side can be inserted into the receiving portion 304 of the front cover 30. In this case, the back cover 31 can be rotated to move the other end 31b side of the back cover 31 to the front side while bringing the back surface of the second piece portion 313 of the back cover 31 into contact with the front surface of the first wall portion 304b of the receiving portion 304.

When the back cover 31 is rotated as described above, the end portion of the back cover 31 on the one end 31a side can be fitted between the first and second wall portions 304b, 304c of the receiving portion 304. At this time, the first protruded portion 314 of the back cover 31 may be in contact with the first wall portion 304b of the receiving portion 304, and the second protruded portion 315 of the back cover 31 may be in contact with the second wall portion 304c of the receiving portion 304. Thus, a contact portion 320 (first movement-restricted portion 32) where any movement in the front-back direction 3b is restricted can be formed on the one end 31a side of the back cover 31. The contact portion 320 may include first and second protruded portions 314, 315 that are in contact with the first and second wall portions 304b, 304c of the receiving portion 304.

Here, the top of the second protruded portion 315 of the back cover 31 has the arc outer surface, so that the rotation of the back cover 31 as described above can be facilitated. Further, although not limited, the distance between the outer surfaces of the first and second protruded portions 314, 315 in the front-back direction 3b is preferably set to be equal to or longer than the distance between the inner surfaces of the first and second wall portions 304b, 304c of the portion 304 before the end portion of the back cover 31 is fitted into the receiving portion 304 of the front cover 30. This results in fitting of the end portion of the back cover 31 into the receiving portion 304 while crushing the first and second protruded portions 314, 315 and while elastically deforming the first and second wall portions 304b, 304c and/or the second piece portion 313, so that the movement of the first movement-restricted portion 32 in the front-back direction 3b can be more reliably restricted.

After the back cover 31 is rotated as described above as shown in (b) of FIG. 21, the fastening member 7 can be fastened to the fastening base portion 303 with the fastening opening 311 of the back cover 31 laying over the fastening base portion 303 of the front cover 30. Thus, the fastened portion 330 (second movement-restricted portion 33) where any movement in the front-back direction 3b is restricted can be formed on the other end 31b side of the back cover 31.

The fastened portion 330 may include the fastening opening 311 and a wall portion surrounding the fastening opening 311.

When the fastening member 7 is fastened to the fastening base portion 303, the third protruded portions 316 (see FIG. 11 and the like) of the back cover 31 may be separated from the bending-restricting portion 306 (see FIG. 8 and the like) of the front cover 30 in the front-back direction 3b. As described above, the third protruded portions 316 may be separated from the bending-restriction portion 306 even if the normal manual pull handling is being performed. The third protruded portions 316 may be brought into contact with the bending-restricting portion 306 at least when an excessive pull handling is performed.

In the door handle device 1 for the vehicle according to this embodiment, the back cover 31 has the flexible portion 34 arranged between the first and second movement-restricted portions 32, 33, and the handling detection sensor 4 detects the bending of the flexible portion 34, so that it is possible to reduce a risk that the user will feel the abutting, and the user's handling feeling can be improved. Further, any movement of the first and second movement-restricted portions 32, 33 in both directions in the front-back directions 3b is restricted, so that it is possible to reduce a risk of rattling of the flexible portion 34, and to improve detection accuracy of the bending of the flexible portion 34.

Further, the movement-restricted portions 32, 33 include the contact portions 320 that are in contact with the first and second wall portions 304b, 304c, so that the movement of the movement-restricted portions 32, 33 in the front and back directions 3b can be more reliably restricted.

Further, the contact portions 320 include the first and second protruded portions 314, 315 that are in contact with the first and second wall portions 304b, 304c, so that the movement of the movement-restricted portions 32, 33 in the front-back direction 3b can be more reliably restricted. However, at least one of the first and second protruded portions 314, 315 may be omitted.

Furthermore, the first protruded portion 314 protrudes from the back surface of the second piece portion 313 in the front-back direction 3b and abuts against the first wall portion 304b, so that the end of the back cover 31 can be fitted into the receiving portion 304 while crushing the first protruded portion 314, and the movement of the movement-restricted portions 32, 33 in the front-back direction 3b can be more reliably restricted.

Furthermore, the top of the second protruded portion 315 has the arc outer surface as viewed in the cross section of the back cover 31 along the longitudinal direction 3a, so that the back cover 315 can be smoothly rotated when the end portion of the back cover 31 is fitted into the receiving portion 304.

Further, the movement-restricted portions 32, 33 include the fastened portion 330 fastened to the front cover 30 by the fastening member 7, so that any movement of the movement-restricted portions 32, 33 in the front-back direction 3b can be more reliably restricted.

Further, the distance between the first and second movement-restricted portions 32, 33 in the longitudinal direction 3a is longer than the distance between the one end 31a and the first movement-restricted portion 32 in the longitudinal direction 3a, and the distance between the other end 31b and the second movement-restricted portion 33 in the longitudinal direction 3a, so that the flexible portion 34 can be more reliably bent by the pull handling.

Furthermore, the flexible portion 34 is arranged without contacting with the front wall portion 300a of the front cover 30, so that it is possible to prevent the front wall portion 300a of the front cover 30 from hindering the bending of the flexible portion 34.

Further, the handling detection sensor 4 includes the non-contact type sensor, so that it is possible to reduce a risk that the handling detection sensor 4 hinders the bending of the flexible portion 34.

Furthermore, the handling detection sensor 4 includes the inductive sensor, so that even if the bending of the flexible portion 34 is slight, the bending of the flexible portion 34 can be more reliably and accurately detected.

Further, at least a part of the handling detection sensor 4 and the entry detection sensor 5 are arranged in the inner space between the front cover 30 and the back cover 31 in the state of the assembly 6 integrated with each other, so that the handling detection sensor 4 and the entry detection sensor 5 can easily be attached.

While the embodiment discloses that the door handle device 1 for the vehicle includes the entry detection sensor 5, the door handle device for the vehicle may not include the entry detection sensor.

In addition, a part of the structure of the front cover 30, such as the second wall portion 304c and the bending-restricting portion 306, may be omitted. Similarly, a part of the structure of the back cover 31, such as the first to fifth protruded portions 314 to 318, may be omitted.

The invention claimed is:

1. A door handle device for a vehicle, the door handle device comprising:
    a handle member attached to a door to be handled by a user during opening and closing of the door, the handle member having a front cover, and a back cover provided integrally with the front cover, the back cover being arranged at a position closer to the door side of the vehicle than the front cover; and
    a handling detection sensor for detecting the handling of the handle member by the user, the handling detection sensor comprising an inductive sensor having a detected portion attached to the front cover and a detecting portion attached to the back cover,
    wherein the back cover comprises:
    a pair of movement-restricted portions arranged at both ends of the back cover in a longitudinal direction, wherein relative movement of the pair of movement-restricted portions to the front cover from a front side to a back side and from the back side to the front side in a front-back direction of the handle member is restricted, and
    a flexible portion arranged between the pair of movement-restricted portions, the flexible portion being bendable according to the handling by the user;
    wherein the handling detection sensor detects the bending of the flexible portion; and
    wherein the front cover includes a bending-restricting portion which is normally separated from a protruded portion of the back cover, the bending-restricting portion being configured to restrict excessive bending of the flexible portion when an excessive pull handling is performed to the handle member by abutting against the protruded portion.

2. The door handle device for the vehicle according to claim 1, wherein:
    the front cover comprises a receiving portion for receiving an end portion of the back cover in the longitudinal direction;

the receiving portion comprises first and second wall portions facing each other in the front-back direction; and one of the movement-restricted portions comprises a contact portion that is in contact with the first and second wall portions.

3. The door handle device for the vehicle according to claim 2, wherein the contact portion comprises a protruded portion whose top portion is in contact with at least one of the first and second wall portions.

4. The door handle device for the vehicle according to claim 3, wherein:

the first wall portion is arranged at a position closer to a back side of the handle member in the front-back direction than the second wall portion;

the back cover comprises: a back cover body; a first piece portion protruding toward the back side in the front-back direction from an end portion of the back cover body in the longitudinal direction; and a second piece portion extending from the first piece portion in the longitudinal direction; and the protruded portion comprises a first protruded portion protruding from a back surface of the second piece portion in the front-back direction to come into contact with the first wall portion.

5. The door handle device for the vehicle according to claim 3, wherein:

the second wall portion is arranged at a position closer to a front side of the handle member in the front-back direction than the first wall portion;

the protruded portion comprises a second protruded portion that is in contact with the second wall portion; and a top portion of the second protruded portion has an arc outer surface as viewed in a cross section of the back cover along the longitudinal direction.

6. The door handle device for the vehicle according to claim 1, wherein:

the longitudinal direction and the front-back directions intersect with each other in a width direction of the handle member, the front cover has a front wall portion extending in the longitudinal direction and the width direction; and the flexible portion is displaceable toward a front side in the front-back direction relatively to the front cover by bending in response to the handling by the user, the flexible portion being arranged without contacting with the front wall portion.

7. The door handle device for the vehicle according to claim 1, wherein the door handle device further comprises at least one electronic component, and wherein at least a part of the handling detection sensor and the electronic component are arranged in an inner space between the front cover and the back cover in a state of an assembly integrated with each other.

* * * * *